US010404025B2

(12) United States Patent
Mayer et al.

(10) Patent No.: US 10,404,025 B2
(45) Date of Patent: Sep. 3, 2019

(54) ARRANGEMENT FOR ELECTRICALLY CONDUCTIVELY CONNECTING A CONTACT PIECE TO AN ELECTRICAL CONNECTOR

(71) Applicant: NEXANS, Paris (FR)

(72) Inventors: Udo Mayer, Weiden (DE); Helmut Steinberg, Stoernstein (DE); Andreas Pedimonte, Weiden (DE); Jean Pierre Bergmann, Erfurt (DE); Rene Schurer, Ilmenau (DE); Toni Muller, Gotha (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 14/831,413

(22) Filed: Aug. 20, 2015

(65) Prior Publication Data
US 2017/0033473 A1   Feb. 2, 2017

Related U.S. Application Data

(62) Division of application No. 14/087,146, filed on Nov. 22, 2013, now abandoned.

(30) Foreign Application Priority Data

Nov. 23, 2012  (EP) ..................................... 12306457
Aug. 30, 2013  (EP) ..................................... 13182307

(51) Int. Cl.
*H01R 43/02* (2006.01)
*B23K 20/12* (2006.01)
(Continued)

(52) U.S. Cl.
CPC ....... *H01R 43/0214* (2013.01); *B23K 20/125* (2013.01); *B23K 20/1205* (2013.01);
(Continued)

(58) Field of Classification Search
CPC ...................... H01R 43/0207; H01R 43/0214; H01R 43/20; H01R 4/023; H01R 4/187;
(Continued)

(56) References Cited

U.S. PATENT DOCUMENTS 3,728,781 A *  4/1973  Curtis ................... H01R 4/023
                                                228/113
6,538,203 B1 *  3/2003  Nolle ..................... H01R 4/625
                                                174/84 C
(Continued)

FOREIGN PATENT DOCUMENTS

DE        10223397        5/2004
DE        10346160        7/2005
(Continued)

*Primary Examiner* — A. Dexter Tugbang
(74) *Attorney, Agent, or Firm* — Sofer & Haroun, LLP

(57) ABSTRACT

An arrangement for electrically conductively connecting a cup shaped copper contact part to an electrical conductor that is made of a plurality of individual wires containing aluminum. The arrangement has a cup-shaped contact part, which includes a bottom and a cylindrical sleeve integrally connected to and projecting away from the bottom with tight contact of the sleeve to the conductor. The cup-shaped contact part is configured to be pushed onto the conductor until the end face of the conductor rests against the bottom of the contact part. At least one rotating tool is configured to be removably placed with sustained pressure, subsequently to the cup-shaped contact part, until the material of the conductor is softened due to the increased temperature of the material of the conductor due to friction to such an extent that it integrally connects to the contact part.

9 Claims, 2 Drawing Sheets

(51) Int. Cl.
  *H01R 4/62* (2006.01)
  *H01R 4/20* (2006.01)
  *H01R 43/20* (2006.01)
  *H01R 4/02* (2006.01)
  *H01R 4/18* (2006.01)
  *B23K 101/32* (2006.01)
  *B23K 101/38* (2006.01)
  *B23K 103/10* (2006.01)
  *B23K 103/12* (2006.01)
  *B23K 103/18* (2006.01)

(52) U.S. Cl.
  CPC ........ *B23K 20/129* (2013.01); *B23K 20/1265* (2013.01); *H01R 4/023* (2013.01); *H01R 4/187* (2013.01); *H01R 4/20* (2013.01); *H01R 4/625* (2013.01); *H01R 43/0207* (2013.01); *H01R 43/20* (2013.01); *B23K 2101/32* (2018.08); *B23K 2101/38* (2018.08); *B23K 2103/10* (2018.08); *B23K 2103/12* (2018.08); *B23K 2103/18* (2018.08); *Y10T 29/49174* (2015.01); *Y10T 29/49179* (2015.01); *Y10T 29/49181* (2015.01); *Y10T 29/53213* (2015.01)

(58) Field of Classification Search
  CPC ...... H01R 4/20; H01R 4/625; B23K 20/1205; B23K 20/125; B23K 20/1265; B23K 20/129; B23K 2201/32; B23K 2201/38; B23K 2203/10; B23K 2203/12; B23K 2203/18; B23K 2101/32; B23K 2101/38; B23K 2103/10; B23K 2103/12; B23K 2103/18; Y10T 29/49174; Y10T 29/49179; Y10T 29/49181; Y10T 29/53213
  See application file for complete search history.

(56) References Cited

U.S. PATENT DOCUMENTS

| | | | |
|---|---|---|---|
| 7,374,466 B2 * | 5/2008 | Onuma | H01R 4/20 439/874 |
| 2006/0208838 A1 | 9/2006 | Beuscher et al. | |
| 2012/0129375 A1 * | 5/2012 | Van Swearingen | H01R 43/20 439/314 |

FOREIGN PATENT DOCUMENTS

| | | |
|---|---|---|
| DE | 102011018353 | 10/2012 |
| JP | 2002134235 A * | 5/2002 |

* cited by examiner

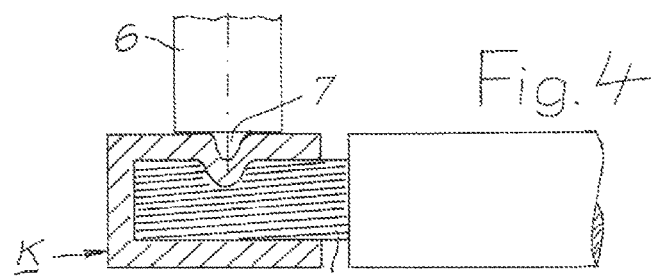
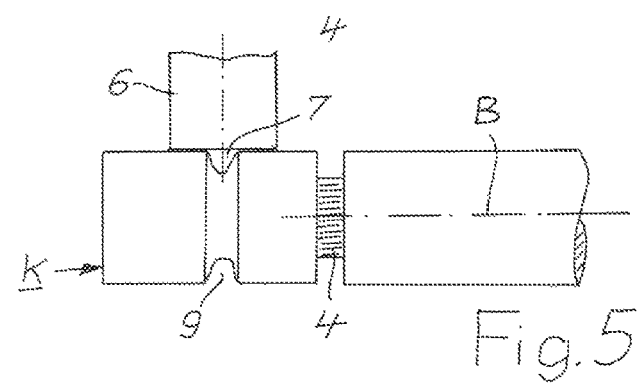
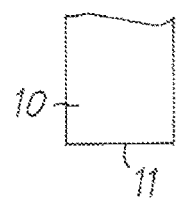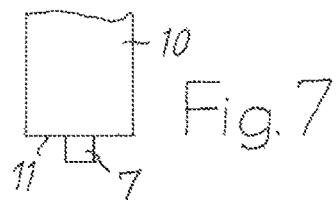
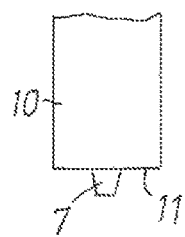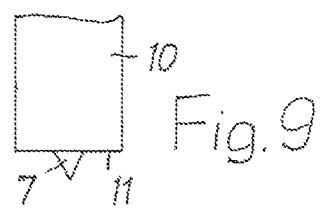

ARRANGEMENT FOR ELECTRICALLY CONDUCTIVELY CONNECTING A CONTACT PIECE TO AN ELECTRICAL CONNECTOR

RELATED APPLICATION

This application is a divisional application of U.S. patent application Ser. No. 14/087,146, filed on Nov. 22, 2013 which in turn claims the benefit of priority from European Patent Application Nos. 12 306 457.8, filed on Nov. 23, 2012 and 13 182 307.2, filed on Aug. 30, 2013, the entirety of which are incorporated by reference.

BACKGROUND

Field of the Invention

The invention relates to a method for electrically conductively connecting a contact piece on the basis of copper to an electrical conductor consisting of a plurality of individual wires of aluminum, as well as a corresponding arrangement.

Description of Prior Art

The contact piece on the basis of copper consists either of copper or of a copper alloy. Additionally, it may have on its outer surface a layer of, for example, tin, zinc or nickel which are for example, precipitated galvanically. In the following, the contact piece is referred to only as "contact piece" without material identification. The individual wires of the conductor are either of aluminum or an aluminum alloy. In the following, only the material "aluminum" is taken into consideration.

Conductors of aluminum are increasingly used especially as replacement for copper conductors for reasons of weight and cost. Principal fields of use of such conductors are, for example, automobile and airplane technology. The lower electrical conductivity of the aluminum as compared to copper does not play a role for most applications. However, problems occur when placing contact parts on the conductors because aluminum conductors are surrounded by an electrically very poorly conducting oxide layer. This deficiency becomes apparent in the case of conductors which are composed of a plurality of individual wires, also called stranded conductors, each of which is surrounded by an oxide layer which cannot be avoided without special treatment. This problem has been known for a long time and is described in numerous documents, wherein the following four references shall be mentioned.

DE 102 23 397 B4 discloses a method by means of which a contact element is electrically mounted on a stranded conductor of aluminum wires. For this purpose, a metal sleeve which is covered on the inner side with tin is pushed onto the end of the stranded conductor. The individual wires are then galvanized or welded at their end faces and with the sleeve by means of ultrasound or protective gas welding. The oxide layers which surround the individual layers are to be broken open in this process. This results in a cover-like tinning or welding at the end of the stranded conductor. Finally, the contact element is pushed on and pressed together with the end of the stranded conductor. The cover-like tinning or welding is not included in the pressing procedure.

DE 103 46 160 B3 describes a method for contacting an aluminum conductor constructed as a stranded conductor in which a contact clamp, which is coated with tin on the inner side and composed of copper, is pushed onto the end of a stranded conductor consisting of aluminum. The tubular contact clamp is coated with tin at the end face of the aluminum conductor by means of ultrasound tinning together with the same, or is welded metal against metal by means of a known welding method.

In the method according to DE 103 57 048 A1, a supply of contacting agent is applied to the end of an existing stranded conductor and is heated at least up to the range of its melting temperature. In so doing, through the contacting agent for forming an electrical contact, a material connection is to be obtained between the stranded conductor and a cup-shaped contact element which is simultaneously or subsequently pushed onto the stranded conductor. For applying the contacting agent, the stranded conductor can be dipped into a tin bath, thereby a portion of the stranded conductor can be severed or cut for forming a fresh cutting or severing surface in the tin bath. The contact element is pressed around the stranded conductor with decreasing effect of the tension.

DE 10 2011 018 353 A1 describes a method for connecting a contact part with a stranded conductor consisting of aluminum. A support sleeve is mounted on the stranded conductor at its end and is pressed together with the same. Subsequently, a rotationally symmetrical contact part is welded to the end face of the stranded conductor, for example, by means of rotational friction welding. In this method, an inter-metal is formed between the contact part and the stranded conductor.

OBJECTS AND SUMMARY OF THE INVENTION

The invention is based on the object of indicating a method for connecting a contact part to an aluminum conductor consisting of individual aluminum wires, through which an effective electrically conductive connection between the entire cross section and the contact part can be achieved.

In accordance with the invention, this object is met by the totality of the following features:

A contact part on the basis of copper is electrically conductively connected to an electrical conductor containing aluminum, in which a contact part is used which contains a bottom and a cylindrical sleeve integrally connected to the bottom and from the sleeve, which, when tightly resting against the sleeve, can be pushed onto the conductor to such an extent that the end face of the conductor rests on the floor of the contact part by means of which subsequently at least one rotating tool is placed with sustained pressure at least in the area of the floor until, due to increased temperature caused by friction the material of the conductor is increased to such an extent that it is integrally connected with the contact part or is welded to the contact part by diffusion, wherein the wall of the contact part is not broken through the tool, and by which, subsequently, the tool is removed from the contact part.

When using this method, the conductor is also at its ends initially freed of possibly present layers, particularly of an insulation surrounding the layer. The contact part is slid, particularly by an insulation surrounding the same, onto the end of the conductor exposed in this manner. The contact part is pushed onto the conductor until its end face rests against the bottom of the contact part. Additional materials such as tin or fastening elements are not used. Subsequently, the tool can be pressed at least against the bottom of the contact part and the contact part is also pressed against the tool.

When placing the tool against the contact part, the latter is advantageously already placed in rotation. However, it can also be placed in rotation only after placement of the contact part. When the method is carried out, the tool rotates with a sufficiently high rate of rotation so that as a consequence of the high temperature produced by the friction, the aluminum of the conductor changes into a doughy state. The material of the contact part is in this procedure also heated, it can only be done to such an extent that the wall of the contact part is pressed in the direction of the conductor. A penetration of the wall of the contact part does not take place. When the desired temperature is reached, the aluminum of the conductor is already softened to such an extent that it can integrally connect with the contact part or by diffusion to the contact part. This is achieved by the increased temperature and the pressure exerted from the tool onto the contact part. Any oxide layers present in the conductor are broken up, so that the electrically conductive connection between conductor and contact part is not impaired. The tool can then be removed from the contact part.

Advantageously, the tool is also additionally or exclusively used at the circumferential surface of the sleeve. The tool can be inserted, for example, at three locations which are offset by 120° in the circumferential direction; however, it can also be pressed against the sleeve in more than three different positions. It is also possible to use two or more tools simultaneously.

In all embodiments of the method, it at least makes sense to "hold" the contact element until it cannot be rotated on the conductor. For this purpose, the contact part can be pressed to the conductor. However, it is also possible to fix the contact part in a holding device.

In accordance with another embodiment of the method, it is also possible to rotate the contact part with the conductor surrounding it about the axis thereof, at an angle of at most 360° when a rotating tool rests against its circumferential surface under pressure.

In accordance with another embodiment of the method, a tool can be used which is adjustable in relation to the axis of the conductor in the radial direction, and which rotates around the contact part. The tool is pressed into the contact part in the radial direction. As a result, it produces a circumferential groove in the contact part.

BRIEF DESCRIPTION OF THE DRAWINGS

The method according to the invention will be explained below with the aid of embodiments.

In the drawing:

FIGS. 4 and 5 show embodiments of the conductor end deviating from FIG. 3.

FIG. 6 shows the end of a tool usable in the method.

FIGS. 7 to 9 show different embodiments modified as compared to FIG. 6.

DETAILED DESCRIPTION

Figure 1:
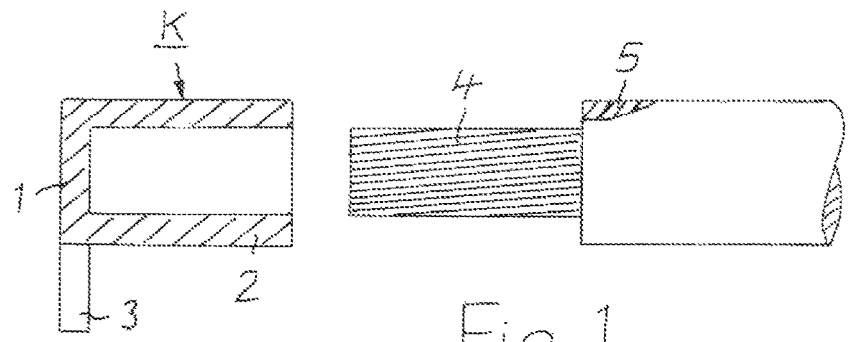
FIG. 1 shows a cup-like contact part and the end of an electrical conductor composed of individual wires, illustrated separately from each other.

The method according to the invention is a welding method, wherein the increased temperature required for welding is produced by friction. The method can also be called "friction stir welding" and has the effect that the aluminum of the conductor integrally connects with the copper of the contact part at a temperature that is lower than the welding temperature, caused also by the pressure applied by the tool and the deformation work applied as a result. Consequently, the tool applied in this manner has correspondingly a friction surface by means of which it can be pressed against the contact part with sustained pressure, or is pressed into the wall of the contact part. The friction surface must be constructed in such a way that the wall of the contact part is not damaged during operation of the tool and in particular does not break through. A protrusion can protrude from the end face of the tool which serves as the friction surface, wherein the protrusion can be arranged symmetrically or asymmetrically relative to the axis of rotation of the tool.

In the following description, in the embodiment of the tool with the protrusion, only one symmetrically arranged protrusion is taken into consideration. Such a tool is also illustrated in the drawings. However, the tool can also be arranged without protrusion. It is placed against the contact part at the beginning of the process and is continuously moved during its rotation in the direction toward the contact part, so that it continuously rests under pressure against the contact part. As already mentioned in a preferred embodiment, it may already have been placed in rotation prior to the contact with the contact part.

In FIG. 1 a sectional view through a contact part K and the end of a conductor are illustrated. The contact part K is composed of copper or a copper alloy. In the following it will only be referred to as "contact part." The conductor consists of a plurality of individual wires of aluminum or of an aluminum alloy. It is in the following merely called "conductor."

The contact part K is constructed cup-shaped. It has a bottom 1 and a single piece cylindrical sleeve 2 connected thereto and protruding from the bottom. The contact part K may be equipped with a connection element 3 for providing for downstream conductors. The connecting element 3 can, as illustrated in the drawing, protrude in the radial direction from the contact part K. However, it may also be arranged so as to extend in the axial direction past the contact part. The conductor 4 consists of a plurality of individual wires which, for example, have already been stranded together. It is surrounded by an insulation 5 which is removed at the end of the conductor 4, so that the individual wires are exposed.

Figure 2:
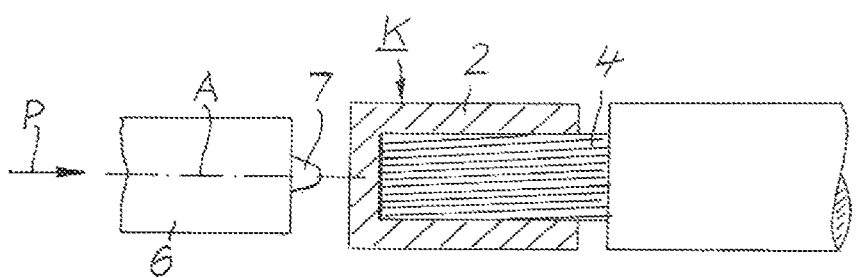
FIG. 2 shows the end of the conductor surrounded by the contact part of FIG. 1, together with the schematically illustrated tool.

For carrying out the method, the contact part K is pushed onto the conductor 4 until its end face rests against the bottom 1 of the contact part K, in accordance with FIG. 2. The sleeve 2 of the contact part K is dimensioned in such a way that it rests tightly against the conductor 4 and tightly contacts the same. A tool 6 is then placed against the contact part K which is constructed with a pin-like protrusion 7. The tool 6 preferably is of steel. It must be in all cases harder than the material of the contact part K. Possible shapes of the tool 6 are explained in connection with FIGS. 7 to 9. By turning the tool 6 about its axis A, the bottom 1 of the contact part K is heated through friction. In order to exclude a rotation of the contact part K on the conductor 4 while the method is being carried out, the contact part K is pressed together with the conductor 4, or is held in position by the holding device which acts from outside.

When carrying out the method, for example, by means of an electrical motor, the tool 6 is rotated about its axis A and is subsequently moved in the direction of the arrow P. It is subsequently pressed with sustained pressure against the bottom 1 of the contact part K, so that the material thereof is heated by friction. This heating is transferred from the contact part K to the conductor 4 which rests with its end face on the bottom 1. The method is carried out at a sufficient rate of rotation of the tool 6 until the material of the conductor 4 has changed over into a doughy state, so that it integrally connects to the contact part K or is welded thereto by diffusion. The appropriate temperature is below 500° C., i.e. relatively well below the melting temperature of aluminum which is about 658° C.

When carrying out the method, the rate of rotation of the tool 6 is, for example, 3,000 rotations per minute. The tool 6 is pressed, for example, with a feed of 150 mm per minute against the contact part K and is moved on average about 0.15 mm. The duration of the method advantageously is between 0.5 and 5.0 seconds.

Figure 3:
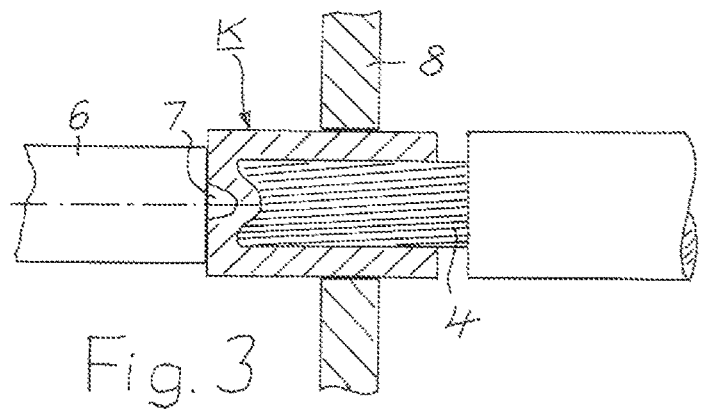
FIG. 3 shows the conductor end with a tool penetrating the contact part.

The material of the bottom 1 of the contact part K is plasticized and deformed at the indicated temperature. Therefore, the bottom 1 of the contact part K is pressed by the tool 6 and particularly the projection 7 without breaking its wall into the conductor 4, as it is illustrated schematically in FIG. 3. As a result, it receives a dent located in the conductor 4 with an increased surface area as compared to the planar bottom, and correspondingly increased contact surface as compared to conductor 4. During the time the above described method is carried out, the contact part K can be held in position by means of a holding device which acts from the outside, as only schematically illustrated in FIG. 3. It particularly prevents a rotation of the contact part K on the conductor 4.

The contact part K can also or additionally be processed in the area of its sleeve 2 by means of a tool 6 in the described sense. For this purpose, the tool 6 according to FIG. 4, is placed against the sleeve 2 in the radial direction. Also, at the appropriate location, the temperature is raised by friction between the tool 6 and the sleeve 2 to such an extent until the above described connection or welding between sleeve 2 and conductor 4 is achieved. Advantageously, the sleeve 2 is processed in the above described sense at three locations which are offset in the circumferential direction by 120°. However, it may also be more than three sides which are randomly distributed over the circumferential surface of the sleeve 2. In particular in this embodiment of the method, it is also possible to use two or more tools simultaneously with a construction intended, for example, for the tool 6.

In a further embodiment of the method, the conductor 4 can also be rotated with a contact part K attached fixedly and non-rotatably thereto. Also, below the tool 6 with protrusion 7 the conductor 4 can be rotated about its axis B, namely in accordance with the schematic illustration in FIG. 5. The rotation of the conductor 4 takes place advantageously about at most 360°, for example, with continuously changing direction of rotation. This results then finally in the sleeve 2 of the contact part K in a circumferential groove 9 extending in the circumferential direction with metallurgical fixedly connected material of the conductor 4. In this sense, two or more parallel grooves can be produced in the sleeve 2.

A possible embodiment of the tool 6 can be seen in FIG. 6. It has a preferably cylindrical bolt 10 with a circular cross section and a planar end face 11 extending perpendicularly to its axis A. The bolt 10 could also have a polygonal cross section. The end face 11 is the friction surface of the tool 6 resting against the contact part K.

In accordance with FIGS. 7 to 9, the bolt 10 of the tool 6 has an increased friction surface due to the protrusion 7 protruding from its end face 11. The radial dimensions of the protrusion 7 are smaller than the radial dimensions of the bolt 10.

In accordance with FIG. 7, the protrusion 7 may be constructed cylindrically. At its free end it can also be provided with a chamfer or it may be rounded.

In accordance with FIG. 8, the protrusion 7 can also be constructed conically with a decreasing diameter pointing away from the bolt 10.

In the embodiments according to FIGS. 7 and 8, the protrusion 7 may additionally be provided with a thread.

Another embodiment of the protrusion 7 is illustrated in FIG. 9. Consequently, the protrusion 7 is constructed so as to extend at an acute angle facing away from the bottom 10.

The invention claimed is:

1. Arrangement for electrically conductively connecting a cup-shaped copper contact part to an electrical conductor composed of a plurality of individual wires containing aluminum, said arrangement comprising:
   said cup-shaped contact part, which includes a bottom and a cylindrical sleeve integrally connected to and projecting away from the bottom with tight contact of the cylindrical sleeve to the conductor, configured to be pushed onto the conductor until an end face of the conductor rests against the bottom of the cup-shaped contact part;
   at least one rotating tool is configured to be removably placed with sustained pressure, subsequently to the cup-shaped contact part being pushed onto the conductor, until a material of the conductor is softened due to an increased temperature of the material of the conductor due to friction to such an extent that the conductor integrally connects to the cup-shaped contact part,
   wherein the cup-shaped contact part and the conductor are constructed such that they can be heated by the at least one rotating tool while maintaining the pressure exerted by the at least one rotating tool on the cup-shaped contact part to such an extent until the material of the conductor is welded by diffusion to the cup-shaped contact part,
   wherein the tool has an end face which serves as a friction surface which is determined for contact with the cup-shaped contact part whose radial dimensions are smaller than radial dimensions of the bottom of the cup-shaped contact part, and wherein the at least one rotating tool has at the end face a protrusion protruding from the end face for contacting the cup-shaped contact part.

2. Arrangement according to claim 1, wherein the protrusion is arranged symmetrically with an axis of the at least one rotating tool.

3. Arrangement according to claim 1, wherein the protrusion is arranged eccentrically with an axis of the at least one rotating tool.

4. Arrangement according to claim 1, wherein the protrusion is constructed so as to be pin shaped.

5. Arrangement according to claim 4, wherein the protrusion is constructed to be cylindrical.

6. Arrangement according to claim 5, wherein the protrusion has a chamfered or rounded tip.

7. Arrangement according to claim 4, wherein the protrusion is constructed conically, with dimensions which decrease with increasing distance from the at least one rotating tool.

8. Arrangement according to one of claim 4, wherein the protrusion is provided with a thread.

9. Arrangement according to claim 4, wherein the protrusion is constructed so as to form an acute angle facing away from the tool.

* * * * *